United States Patent
Yamakoshi et al.

(10) Patent No.: US 7,718,209 B2
(45) Date of Patent: May 18, 2010

(54) LOW-SALT SOY SAUCE

(75) Inventors: Jun Yamakoshi, Noda (JP); Kohsuke Matsumoto, Noda (JP); Makoto Saito, Noda (JP); Hitomi Aota, Noda (JP); Takeharu Nakahara, Noda (JP); Satoshi Fukuda, Noda (JP); Tetsuya Oguma, Noda (JP); Norikazu Fujii, Noda (JP)

(73) Assignee: Kikkoman Corporation, Noda-shi (JP)

( * ) Notice: Subject to any disclaimer, the term of this patent is extended or adjusted under 35 U.S.C. 154(b) by 337 days.

(21) Appl. No.: 11/575,834

(22) PCT Filed: Aug. 5, 2005

(86) PCT No.: PCT/JP2005/014427

§ 371 (c)(1),
(2), (4) Date: Mar. 22, 2007

(87) PCT Pub. No.: WO2006/033205

PCT Pub. Date: Mar. 30, 2006

(65) Prior Publication Data

US 2008/0057174 A1    Mar. 6, 2008

(30) Foreign Application Priority Data

Sep. 22, 2004    (JP)    ............... 2004-275040

(51) Int. Cl.
*A23L 1/40*    (2006.01)
(52) U.S. Cl. .............. 426/589; 426/49; 426/618; 426/650; 426/656; 426/658
(58) Field of Classification Search ............ 426/7, 426/49, 442, 582, 589, 618, 655, 656, 658, 426/806
See application file for complete search history.

(56) References Cited

U.S. PATENT DOCUMENTS 4,382,964 A    5/1983    Noda et al.
5,472,730 A *  12/1995   Saikusa et al. .............. 426/618
5,631,038 A    5/1997    Kurtz et al.
2006/0275346 A1* 12/2006  Tsuchiya et al. ............ 424/439

FOREIGN PATENT DOCUMENTS

| JP | 38-006582 | 5/1963 |
| JP | 06-007111 | 1/1994 |
| JP | 07227245 | 8/1995 |
| JP | 11-151072 | 6/1999 |
| JP | 2002-325554 | 11/2002 |
| JP | 2004-290129 | 10/2004 |
| JP | 2004357535 | 12/2004 |
| WO | 2005/096841 | 10/2005 |

OTHER PUBLICATIONS

Nakajima et al. (JP 11000136 A), JPO Abstract and Machine Transalation only, Jan. 6, 1999; Translated Apr. 22, 2009.*

* cited by examiner

*Primary Examiner*—Keith D Hendricks
*Assistant Examiner*—Elizabeth Gwartney
(74) *Attorney, Agent, or Firm*—Oblon, Spivak, McClelland, Maier & Neustadt, L.L.P.

(57) ABSTRACT

A low common salt soy sauce, which has good flavor, significantly suppresses elevation of blood pressure, prevents cardiac hypertrophy, and is also available as special nutritious food, is obtained. 1.0% to 10.0% by weight of potassium chloride and 0.1% to 5.0% by weight of γ-aminobutyric acid are added to a reduced common salt soy sauce, so as to obtain a low common salt soy sauce of issue. Otherwise, a KCl-containing low common slat soy sauce is obtained by: (1) a common production method of soy sauce, in which a mixed solution consisting of KCl and common salt is used as mother water; (2) a method of subjecting a soy sauce obtained using saline solution as mother water to electrodialysis, a membrane treatment, or the like, so as to eliminate common salt from the above soy sauce, and then adding KCl thereto; or other methods. Thereafter, γ-aminobutyric acid is added to the above KCl-containing low common salt soy sauce, so as to obtain a low common salt soy sauce comprising 0% to 10% by weight of common salt, 1.0% to 10.0% by weight of potassium chloride, and 0.1% to 5.0% by weight of γ-aminobutyric acid.

20 Claims, No Drawings

LOW-SALT SOY SAUCE

TECHNICAL FIELD

The present invention relates to a low common salt soy sauce, which has good flavor, significantly suppresses elevation of blood pressure, prevents cardiac hypertrophy, and is also available as special nutritious food. The term "reduced common salt soy sauce" is used in the present invention to mean a soy sauce comprising 0% to 10% by weight (W/V %) of sodium chloride which is also referred to as NaCl or common salt at times.

BACKGROUND ART

Soy sauce, one of typical Japanese condiments, has unique flavor, and thus, it has achieved a new recognition that it is able to exhibit an excellent cooking effect upon Western-style cuisine as well as upon Japanese cuisine. Based on such recognition, soy sauce has been increasingly demanded as a universal condiment in the United States, Europe, Southeast Asia, etc.

In general, soy sauce is produced by inoculating filamentous fungi belonging to genus *Aspergillus* or the like into a mixture consisting of a protein raw material such as soybeans denatured by heating and a starch raw material such as wheat, culturing the obtained mixture to produce soy sauce koji, adding the koji into saline solution, and then fermenting and aging the mixture, followed by filtration of the resultant.

A main purpose for adding the soy sauce koji into saline solution and then fermenting and aging the obtained mixture is prevention of mash putrefaction during the fermentation and aging process. The concentration of salt in saline solution, into which the koji is added, is generally between 15% and 25% by weight. Using saline solution having such a salt concentration, a soy sauce product having a common salt concentration of 10% to 20% by weight can be obtained.

On the other hand, it is said that excessive ingestion of common salts affects renal disease, heart disease, or hypertension. Since soy sauce contains a large amount of salt, there is a fear that it affects such diseases.

Under the aforementioned circumstances, various types of methods for producing a low common salt soy sauce have been studied. Examples of such a production method that has been attempted may include: a method of using saline solution with a lower concentration, such as a method of using saline solution with a minimum concentration that is necessary for avoiding putrefaction or a method of using alcohol together with mother water; and a method of producing a low common salt soy sauce by eliminating common salt from a soy sauce containing 15% to 18% by weight of the common salt obtained by a common method by means of electrodialysis, a membrane treatment and so on.

Moreover, a method of substituting a portion of common salt contained in a soy sauce with potassium chloride (KCl) has also been proposed.

Examples of such a method that has been proposed may include: an ordinary soy sauce production method, which is devised such that it comprises adding koji to a KCl solution used as mother water instead of saline solution, followed by fermentation and aging, so as to produce a KCl-containing soy sauce that contains no common salts, and at the same time, adding koji to saline solution used as mother water, followed by fermentation and aging, so as to produce a normal common salt-containing soy sauce, and then mixing both types of soy sauces, thereby obtaining a low common salt soy sauce (Patent Document 1); and a method of adding soy sauce koji to a mixed solution consisting of common salt and KCl used as mother water, followed by fermentation and aging, thereby obtaining a low common salt soy sauce (Patent Document 2).

Such a method of substituting a portion of common salt contained in a soy sauce with potassium chloride (KCl) so as to produce a low common salt soy sauce includes easy industrial operations, and thus it is extremely advantageous. On the other hand, KCl has distinctive bitter taste, which brings on a fatal demerit to a soy sauce. Accordingly, this method has been disadvantageous in that the amount of common salt substituted with KCl is consequently restricted.

A method of obtaining special nutritious foods (for example, soy sauce) for patients with hypertension, which uses soybeans, soybean germs, or ground soybeans that contain γ-aminobutyric acid-enriched soybean germs, instead of soybeans (or defatted soybeans), in a common production method of soybean processed foods (for example, soy sauce), has been known. However, it has not yet been known whether or not a soy sauce used for patients with hypertension can actually be produced by this method (Patent Document 3).

According to the studies of the present inventors, if γ-aminobutyric acid is added to a soy sauce and the content thereof is increased, the effect of suppressing elevation of blood pressure can be expected. However, it is hardly to say that such effect is sufficient.

Patent Document 1: JP Patent Publication (Kokoku) No. 38-6582 B (1963)

Patent Document 2: JP Patent Publication (Kokai) No. 56-68372 A (1981)

Patent Document 3: JP Patent Publication (Kokai) No. 11-151072 A (1199)

DISCLOSURE OF THE INVENTION

It is an object of the present invention to obtain a low common salt soy sauce, a common salt concentration of which is low, and which has good flavor, significantly suppresses elevation of blood pressure, and is also available as special nutritious food.

The present inventors have focused on the fact that a method of producing a low common salt soy sauce by substituting a portion of common salt with KCl includes easy industrial operations and thus that his method is extremely advantageous. Thus, the inventors have conducted concentrated studies directed towards eliminating a KCl-specific bitter taste, and also obtaining a low common salt soy sauce capable of significantly suppressing elevation of blood pressure. As a result, the inventors have unexpectedly found that γ-aminobutyric acid is added to the KCl-containing low common salt soy sauce, so as to obtain a soy sauce having no bitter taste, and that when both KCl and γ-aminobutyric acid are added to a reduced common salt soy sauce, elevation of blood pressure can be significantly suppressed.

A technique of increasing the concentration of γ-aminobutyric acid in soy sauce so as to suppress elevation of blood pressure has previously been known (JP Patent Publication (Kokai) No. 11-151072 A (1999); γ-aminobutyric acid-enriched soybean food material). However, the soy sauce of this invention means an ordinary common salt-containing soy sauce, and it does not contain KCl. In addition, the purpose for increasing the amount of γ-aminobutyric acid in the invention is to produce special nutritious food for patients with hypertension, and thus this purpose differs from that of the present invention, which is to provide a KCl-containing low common salt soy sauce that has no bitter taste derived from the KCl.

The present inventors have found for the first time that such bitter taste derived from KCl disappears as a result of addition of γ-aminobutyric acid to a KCl-containing low common salt soy sauce.

Moreover, the present inventors have also found that the coexistence of γ-aminobutyric acid and potassium chloride in a low common salt soy sauce enables significant suppression of elevation of blood pressure and prevention of cardiac hypertrophy.

The present invention has been completed based on these findings. That is to say, the present invention relates to a low common salt soy sauce, which is produced by adding 1.0% to 10.0% by weight of potassium chloride and 0.1% to 5.00 by weight of γ-aminobutyric acid to a reduced common salt soy sauce. In addition, the present invention also relates to a low common salt soy sauce, which comprises 0% to 10% by weight of common salt, 1.0% to 10.0% by weight of potassium chloride, and 0.1% to 5.0% by weight of γ-aminobutyric acid.

The present invention provides a KCl-containing low ton salt soy sauce, the bitter taste of which has disappeared, and which significantly suppresses elevation of blood pressure, prevents cardiac hypertrophy, and is also available as special nutritious food.

This specification includes the contents as disclosed in the specification and/or drawings of Japanese Patent Application No. 2004-275040, which is a priority document of the present application.

BEST MODE FOR CARRYING OUT THE INVENTION

Any given method can be adopted as a method of allowing a reduced common salt soy sauce to contain 1.0% to 10.0% by weight of potassium chloride. Examples of such a method may include: (1) a method using a mixed solution consisting of KCl and common salt as mother water in an ordinary soy sauce production method; (2) a method of mixing a soy sauce produced using only saline solution as mother water, into a soy sauce produced using only a KCl solution as mother water; and (3) a method, which comprises subjecting a common soy sauce produced using saline solution as mother water to electrodialysis, a membrane treatment, or the like, so as to eliminate common salt from the soy sauce, and then adding KCl to the thus obtained soy sauce. Examples of potassium chloride used herein may include ordinary potassium chloride and seawater salt that contains a highly concentrated potassium chloride.

In addition, γ-aminobutyric acid added to such a KCl-containing low common salt soy sauce is an inhibitory neurotransmitter existing in the brain or spinal cord of mammals. Such γ-aminobutyric acid is a publicly known substance. It has been reported that this substance activates blood flow in the brain, increases the amount of oxygen supplied so as to accelerate the metabolic functions of the brain, and acts on the vasomotor center of the spinal cord so as to decrease blood pressure, and has also been reported that the substance suppresses the secretion of vasopressin acting as an antidiuretic hormone and expand blood vessel so as to decrease blood pressure (*Shinpen Nou-taisha Fukatuzai* (New Edition, Brain Metabolism Activator), Eiichi Ohtomo, Iyaku Journal Co., Ltd., 1987).

Such γ-aminobutyric acid can be easily obtained by allowing glutamic acid decarboxylase and glutaminase to act on a glutamine-containing raw material (JP Patent Publication No. 2002-300862 A; a production method of γ-aminobutyric acid-containing natural food material). According to this invention, γ-aminobutyric acid-containing powders (γ-aminobutyric acid crude purified product) can be easily obtained. A γ-aminobutyric acid-containing solution is concentrated and purified by ion exchange chromatography or the like, so as to easily obtain a purified product thereof. Moreover, as such γ-aminobutyric acid, a commercially available product, a reagent, or the like can be adopted.

The content of γ-aminobutyric acid in a low common salt soy sauce may be adjusted by adding γ-aminobutyric acid to a reduced common salt soy sauce.

Otherwise, the content of γ-aminobutyric acid in a low common salt soy sauce may also be adjusted by the following methods in a general soy sauce production process: (1) a γ-aminobutyric acid-enriched soy sauce making material (a protein raw material or a starch raw material) is used in a soy sauce production process, so as to generate and accumulate γ-aminobutyric acid in a mash solution; (2) good microorganisms (*Aspergillus*, yeast, lactic acid bacteria, or other good bacteria) are added to soy sauce koji or soy sauce mash, so as to generate and accumulate γ-aminobutyric acid in the soy sauce mash solution by the fermentation means of the above microorganisms; and (3) various types of enzymes (glutamic acid decarboxylase, glutaminase, peptidase, protease, etc.) are added to soy sauce koji or soy sauce mash, so as to generate and accumulate γ-aminobutyric acid in the soy sauce koji or the soy sauce mash by the decomposition means of such enzymes.

When a common salt concentration is high in a mash solution (or pure soy sauce or burnt soy sauce), desalination is conducted, so as to obtain a low common salt soy sauce of interest.

The content of γ-aminobutyric acid in a low common salt soy sauce is preferably adjusted to be between 0.1% and 5.0% by weight. Among others, 0.2% to 35% by weight of γ-aminobutyric acid is more preferable.

It has been known that such γ-aminobutyric acid has delicious taste (umami) attended with sweetness, and that it can also be used as a food additive or a condiment (JP Patent Publication No. 11-151072 A (1999); γ-aminobutyric acid-enriched soybean food material).

If the amount of γ-aminobutyric acid added is less than 0.1% by weight, a clear effect of eliminating bitter taste cannot be obtained. In contrast, if the amount of γ-aminobutyric acid added is more than 5.0% by weight, the influence by a particular taste derived from γ-aminobutyric acid appears, and thus the original flavor of soy sauce is impaired.

The period in which γ-aminobutyric acid is added is any given process in a production method of soy sauce, for example. A process that is as close to the final product as possible, such as a pure soy sauce (or mash-squeezed solution) obtained before a burning process, is preferable.

A KCl-containing low common salt soy sauce, to which γ-aminobutyric acid has been added by this means, does not have bitter taste specific for KCl and is a product with good flavor.

Experiment Example 1

Preparation of Glutamic Acid Decarboxylase

Glutamic acid decarboxylase was prepared in accordance with the method of Ueno et al (Biosci. Biotech. Biochem., 61(7), 1168-1171, 1997. That is to say, *Lactobacillus brevis* IFO12005 was inoculated into 20 L of a GYP medium (1% glucose, 1% yeast extract, 0.5% polypeptone, 1% sodium glutamate), and the obtained mixture was cultured in a jar fermenter (30-L volume) at 30° C. for 72 hours. After completion of the culture, a cell mass was collected by centrifugation (8,000×g; 30 minutes). Thereafter, 1 L of a buffer solution (a 20 mM phosphate buffer solution that contained 0.1 mM pyridoxal phosphate and 0.1 mM mercaptoethanol; pH 7 was added to 100 g of the obtained cell mass (wet cell mass). Thereafter, 10 mL of a lysozyme solution (0.2 mg/mL) was further added thereto, and the obtained mixture was then treated at 37° C. for 5 minutes. A cell solution obtained after completion of the above treatment was disintegrated with an ultrasonic crusher (Sonic; manufactured by NISSEI Corporation), and the resultant was then centrifuged (20,000×g; 30 minutes) so as to remove a precipitate, thereby obtaining a glutamic acid decarboxylase solution (a crude enzyme solution 3.2 units/mL).

Experiment Example 2

Production Example of γ-Aminobutyric Acid

Using the glutamic acid decarboxylase prepared in the above described Experiment example 1, γ-aminobutyric acid was produced.

That is to say, 70 g of wheat gluten, 2.5 g of a commercially available protease agent, and 0.2 g of Glutaminase Daiwa C-100 (manufactured by Daiwa Kasei K.K.) were added to 180 mL of warm water followed by decomposition at 50° C. for 24 hours.

After completion of the decomposition, 20 mL of the glutamic acid decarboxylase solution obtained in Experiment 1 was added to the resultant, and the obtained mixture was then reacted at 30° C. for 24 hours. Thereafter, the obtained enzyme-treated solution was filtrated with a filter, and was then filtrated with Celite, so as to obtain a clarified brown solution. The concentration of γ-aminobutyric acid in this solution was approximately 16 mg/mL. This solution was freeze-dried, so as to obtain γ-aminobutyric acid-containing powders, in which the content of γ-aminobutyric acid was approximately 6% by weight.

EXAMPLES

Example 1

Production Example of Low Common Salt Soy Sauce of the Present Invention

Defatted soybeans that had been denatured by steaming were mixed with the nearly equal quantity of wheat that had been roasted and crushed. Thereafter, seed koji was inoculated into the above mixture, followed by koji making through ventilation for 42 hours, so as to obtain soy sauce koji. The obtained soy sauce koji was added to highly-concentrated saline solution, and the obtained mash was then treated for 150 days according to a common method, while stirring at a temperature between 25° C. and 30° C. as appropriate, so that the mash could be fermented and aged. Thereafter, the mash was subjected to pressing and filtration, so as to obtain a pure soy sauce containing approximately 18% of common salt and approximately 1.7% of T.N.

This pure soy sauce was subjected to a desalination treatment using an electrodialyzer, so as to obtain a desalinated soy sauce containing 0.5% by weight of common salt and approximately 1.6% by weight of T.N.

This desalinated soy sauce was divided into 4 parts. Thereafter, 9.5% by weight of sodium chloride was added to the first part and was dissolved therein, so as to obtain a low common salt soy sauce, which contained 10% by weight of common salt, used as a control example.

In addition, 6.5% by weight of sodium chloride and 3.0% by weight of potassium chloride were added to the second part, so as to obtain the low common salt soy sauce of Comparative example 1.

Moreover, 9.5% by weight of sodium chloride and 10% by weight of the γ-aminobutyric acid-containing powders obtained in Experiment example 2, which contained approximately 6% by weight of γ-aminobutyric acid, were added to the third part and were then dissolved therein, so as to obtain the low common salt soy sauce of Comparative example 2.

Furthermore, 6.5% by weight of sodium chloride, 3.0% by weight of potassium chloride, and 10% by weight of the γ-aminobutyric acid-containing powders obtained in Experiment example 2, which contained approximately 6% by weight of γ-aminobutyric acid, were added to the fourth part and were then dissolved therein, so as to obtain the low common salt soy sauce of the present invention.

Subsequently, each of the above low common salt soy sauces was burnt at 80° C. for 3 hours, and the resultant soy sauce was then clarified and filtrated, so as to obtain 4 types of low common salt soy sauces, namely, the soy sauce of Control example, that of Comparative example 1, that of Comparative example 2, and that of the present invention.

A sensory test was carried out in terms of the bitter taste of these 4 types of low common salt soy sauces.

The sensory test was carried out with panelists who had been trained to have ability to discriminate among various tastes. A method of evaluating bitter taste such that no bitter taste felt is "−," slight bitter taste felt is "+−," bitter taste felt is "+," and strong bitter taste felt is "++" was adopted.

The results are shown in Table 1.

TABLE 1

Results of sensory test regarding bitter taste of low common salt soy sauce

| Item | Composition of salt | | γ-aminobutyric acid | Sensory test results (presence or absence of bitter taste) | Remarks |
| --- | --- | --- | --- | --- | --- |
| | NaCl | KCl | | | |
| Control example | 10% | None | None | − | Good flavor |
| Comparative example 1 | 7% | 3% | None | + | Bitter taste felt |
| Comparative example 2 | 10% | None | 0.60% | − | Good flavor |
| The present invention | 7% | 3% | 0.60% | − | Good flavor |

As is apparent from the results of the sensory test as shown in Table 1, it is found that the bitter taste of a KCl-containing soy sauce disappeared as a result of addition of γ-aminobutyric acid to the soy sauce, and that the present invention was advantageous as a production method of a low common salt soy sauce.

In the method of producing a low common salt soy sauce of the present invention as described above in Example 1, the total salt concentration of NaCl and KCl in the soy sauce was changed to 8%, 9%, 11% and 12% but the salt composition ratio between NaCl and KCl was always 7:3, and thus the same sensory test as mentioned above was carried out. As a result, almost the same results were obtained.

Experiment Example 3

Experiment Example for Confirmation of Antihypertensive Effect

Thirty spontaneous hypertension rats (hereinafter referred to as SHR rats) of 5-week-old were divided into the following 5 groups each containing 6 rats, and a mixed feed administration test was then carried out for 1 week.

MF powder feed (manufactured by Oriental Yeast Co., Ltd. feed for breeding mice and rats) was given to the first group (Control example 1).

A feed, which contained 6% by weight of common salt, obtained by mixing freeze-dried powders of a reduced common salt soy sauce, which contained 8% by weight of common salt, into the above MF powder feed was given to the second group (Control example 2).

A feed, which contained 6% by weight of common salt and 1% by weight of KCl, obtained by mixing freeze-dried powders of a KCl-enriched reduced common salt soy sauce, which contained 8% by weight of common salt and 1.34% by weight of KCl, into the above MF powder feed was given to the third group (Comparative example 1).

A feed, which contained 6% by weight of common salt and 0.1% by weight of γ-aminobutyric acid, obtained by mixing freeze-dried powders of a γ-aminobutyric acid-enriched reduced common salt soy sauce, which contained 8% by weight of common salt and 0.14% by weight of γ-aminobutyric acid, into the above MF powder feed was given to the fourth group (Comparative example 2). A feed, which contained 6% by weight of common salt, 1% by weight of KCl, and 0.1% by weight of γ-aminobutyric acid, obtained by mixing freeze-dried powders of a KCl- and γ-aminobutyric acid-enriched reduced common salt soy sauce, which contained 8% by weight of common salt, 1.34% by weight of KCl, and 0.14% by weight of γ-aminobutyric acid, into the above MF powder feed was given to the fifth group (the present invention).

Before initiation of the test and 1 week after beginning the test, systolic blood pressure was measured using a noninvasive hemodynamometer MK-2000 used for rats and mice, manufactured by Muromachi Kikai Co., Ltd.

The results are shown in Table 2.

It is to be noted that, as for statistical processing, the ANOVA-Dunnet test was carried out between the test group of Control example 2, wherein a reduced common salt soy sauce had been given to the rats, and other groups.

TABLE 2

Results of test regarding hypertension preventive effect

| Item | Additive | Systolic blood pressure (mmHg) Before initiation of the test | 1 week after beginning the test | Remarks |
|---|---|---|---|---|
| Control example 1 | — | 121 ± 10 | 126 ± 6*** | — |
| Control example 2 | Reduced common salt soy sauce | 120 ± 10 | 146 ± 6 | — |
| Comparative example 1 | KCl-enriched reduced common salt soy sauce | 119 ± 5 | 131 ± 8** | Effective |
| Comparative example 2 | γ-aminobutyric acid-enriched reduced common salt soy sauce | 119 ± 11 | 138 ± 8 | Effective |
| The present invention | KCl- and γ-aminobutyric acid-enriched reduced common salt soy sauce | 122 ± 9 | 128 ± 7*** | Significantly effective |

Note)
**$p < 0.01$,
***$p < 0.001$

From the results as shown in Table 2, it is found that when compared with Control example 1 wherein only a general feed was given to the rats, blood pressure was elevated in Control example 2 wherein a reduced common salt soy sauce was given to the rats. In addition, it is also found that when compared with such Control example 2, elevation of blood pressure can be suppressed in Comparative example 1 wherein a KCl-enriched reduced common salt soy sauce was given to the rats. Moreover, it is also found that elevation of blood pressure can be suppressed in Comparative example 2 wherein a γ-aminobutyric acid-enriched reduced common salt soy sauce was given to the rats.

In contrast, it is found that elevation of blood pressure can be significantly and reliably suppressed in the present invention wherein a KCl- and γ-aminobutyric acid-enriched reduced common salt soy sauce was given to the rats.

Example 2

3% by weight of potassium chloride and 3.5% by weight of γ-aminobutyric acid (purity: 99%) (manufactured by Sigma) were added to a commercially available reduced common salt soy sauce, which contained 8% by weight of common salt, so as to obtain the low common salt soy sauce of the present invention.

Experiment Example 4

Experiment Example for Confirmation of Effect of Suppressing Hypertensive Cardiac Hypertrophy Eighteen spontaneous hypertension rats (hereinafter referred to as SHR rats) of 5-week-old were divided into the following 3 groups each containing 6 rats, and a test was then carried out.

6% common salt NaCl)-added feed, obtained by adding 6% common salt to "MF powder feed" used for breeding mice and rats, manufactured by Oriental Yeast Co., Ltd., was given to the first group (Control example 1).

A feed obtained by further adding 1% KCl to the 6% common salt NaCl)-added feed was given to the second group (Comparative example).

A feed obtained by adding 1% KCl and 0.2% γ-aminobutyric acid to the 6% common salt (NaCl)-added feed was given to the third group (the present invention).

When a test period of 3 weeks was terminated, the body weight of each rat was measured. Thereafter, the rat was sacrificed by exsanguination under anesthesia with Nembutal, and the heart thereof was then excised from the rat. The wet weight of the excised heart was measured, and the weight of the heart was calculated based on 100 g of the body weight. In addition, a relative value was calculated in a case where the heart weight based on 100 g of the body weight of Comparative example 1 was defined as 100. These results are shown in Table 3.

From the results as shown in Table 3, it was revealed that when compared with the control group wherein common salt was added but γ-aminobutyric acid and potassium chloride were not added, or the comparative example wherein common salt and potassium chloride were added but γ-aminobutyric acid was not added, the wet weight of the heart was reduced by approximately 7% in the present invention wherein γ-aminobutyric acid and potassium chloride were added as well as common salt. From such results, it is found that according to the present invention, a low common salt soy sauce, which is able to suppress elevation of blood pressure and is also able to prevent cardiac hypertrophy, can be obtained.

effect of suppressing cardiac hypertrophy. In addition, since the above low common salt soy sauce has good flavor, it can also be used as special nutritious food for patients with hypertension. Moreover, since the above low common salt soy sauce has a proper level of salty taste in spite of a low content of common salt, as with a soy sauce having a general common salt concentration, it can be used as a soy sauce for sashimi (sliced raw fish), tempura (Japanese deep-fried food), Japanese pickles, etc., as a soy sauce for natto (fermented soybeans), tofu (soy bean curd), etc., and also as a soy sauce for use as a material in producing seasoning soy sauce for noodles, marinade sauce, dressing, noodle soup, etc. Furthermore, the low common salt soy sauce of the present invention can also be used as a soy sauce for use in processing food boiled in soy sauce, fish cake products, meat cake products, etc.

All publications, patents and patent applications cited herein are incorporated herein by reference in their entirety.

The invention claimed is:

1. A low common salt soy sauce, which is produced by a process comprising
   adding 1.0% to 10.0% by weight of potassium chloride and 0.1% to 5.0% by weight of γ-aminobutyric acid to a reduced common salt soy sauce, thereby producing the low common salt soy sauce.

2. A seasoning soy sauce for a noodle, a marinade sauce, a dressing, or a noodle soup comprising the low common salt soy sauce of claim 1.

3. The low common salt soy sauce of claim 1, wherein in the process for producing the low common salt soy sauce, 1.0% to 10.0% by weight of potassium chloride and 0.2% to 3.5% by weight of γ-aminobutyric acid are added to the reduced common salt soy sauce.

4. A method for processing food boiled in a soy sauce, a fish cake product, or a meat cake product, the method comprising contacting the food, the fish cake product, or the meat cake product with the low common salt soy sauce of claim 1.

5. A method of making the low common salt soy sauce of claim 1, the method comprising adding 1.0% to 10.0% by weight of potassium chloride and 0.1% to 5.0% by weight of γ-aminobutyric acid to a reduced common salt soy sauce, thereby producing the low common salt soy sauce of claim 1.

6. A low common salt soy sauce, which comprises
   0% to 10% by weight of common salt,
   1.0% to 10.0% by weight of potassium chloride, and
   0.1% to 5.0% by weight of γ-aminobutyric acid.

TABLE 3

Results of test regarding hypertensive cardiac hypertrophy preventive effect

| Item | Additive | Wet weight of heart (g/100 g of body weight) | Relative value | Remarks |
|---|---|---|---|---|
| Control example | NaCl | 0.488 ± 0.012 | 102 | — |
| Comparative example | NaCl + KCl | 0.481 ± 0.037 | 100 | — |
| The present invention | NaCl + KCl + γ-aminobutyric acid | 0.447 ± 0.020* | 93 | Effective |

Note)
*$p < 0.05$

INDUSTRIAL APPLICABILITY

A low common salt soy sauce obtained in the present invention has the effect of suppressing elevation of blood pressure in spite of ingestion of common salt, and also has the 7. A seasoning soy sauce for a noodle, a marinade sauce, a dressing, or a noodle soup comprising the low common salt soy sauce of claim 6.

8. The low common salt soy sauce of claim 6, comprising 0.2% to 3.5% by weight of γ-aminobutyric acid.

9. The low common salt soy sauce of claim 6, comprising
7% by weight of common salt,
3% by weight of potassium chloride, and
0.6% by weight of γ-aminobutyric acid.

10. The low common salt soy sauce of claim 6, comprising
8% by weight of common salt,
1.34% by weight of potassium chloride, and
0.14% by weight of γ-aminobutyric acid.

11. The low common salt soy sauce of claim 6, comprising
8% by weight of common salt,
3% by weight of potassium chloride, and
3.5% by weight of γ-aminobutyric acid.

12. A method for processing food boiled in a soy sauce, a fish cake product, or a meat cake product, the method comprising contacting the food, the fish cake product, or the meat cake product with the low common salt soy sauce of claim 6.

13. A method of making the low common salt soy sauce of claim 6, the method comprising:
adding, to a desalinated soy sauce, the following ingredients:
a γ-aminobutyric acid comprising powder,
potassium chloride, and
optionally, common salt;
such that the low common salt soy sauce comprises:
0% to 10% by weight of common salt,
1.0% to 10% by weight of potassium chloride, and
0.1% to 5.0% by weight of γ-aminobutyric acid.

14. The method of claim 13, further comprising, after the adding, burning the soy sauce.

15. The method of claim 14, wherein the burning is conducted at 80° C. for 3 hours.

16. The method of claim 13, further comprising, after the burning, clarifying and filtering the burned soy sauce to produce the low common salt soy sauce.

17. A method of making the low common salt soy sauce of claim 6, the method comprising:
adding, to a desalinated soy sauce, the following ingredients:
common salt,
a γ-aminobutyric acid comprising powder, and
potassium chloride;
such that the low common salt soy sauce comprises:
7% by weight of common salt,
3% by weight of potassium chloride, and
0.6% by weight of γ-aminobutyric acid.

18. The method of claim 17, further comprising, after the adding, burning the soy sauce.

19. The method of claim 18, further comprising, after the burning, clarifying and filtering the burned soy sauce to produce the low common salt soy sauce.

20. The method of claim 18, wherein the burning is conducted at 80° C. for 3 hours.

* * * * *